United States Patent
Lovera Prado

(10) Patent No.: US 11,826,223 B2
(45) Date of Patent: Nov. 28, 2023

(54) DENTAL IMPLANT WITH FOLDABLE FINS

(71) Applicant: Keila Lovera Prado, Esplugues de Llobregat (ES)

(72) Inventor: Keila Lovera Prado, Esplugues de Llobregat (ES)

(*) Notice: Subject to any disclaimer, the term of this patent is extended or adjusted under 35 U.S.C. 154(b) by 268 days.

(21) Appl. No.: 16/956,594

(22) PCT Filed: Dec. 12, 2018

(86) PCT No.: PCT/ES2018/070801
§ 371 (c)(1),
(2) Date: Jun. 21, 2020

(87) PCT Pub. No.: WO2019/122473
PCT Pub. Date: Jun. 27, 2019

(65) Prior Publication Data
US 2022/0133443 A1  May 5, 2022

(30) Foreign Application Priority Data
Dec. 22, 2017  (ES) ................ ES201731459

(51) Int. Cl.
*A61C 8/00*  (2006.01)

(52) U.S. Cl.
CPC .......... *A61C 8/0033* (2013.01); *A61C 8/0025* (2013.01); *A61C 8/0068* (2013.01); *A61C 8/0071* (2013.01)

(58) Field of Classification Search
CPC ... A61C 8/0033; A61C 8/0025; A61C 8/0058; A61C 8/0071; A61C 8/0018; A61C 8/00;
(Continued)

(56) References Cited

U.S. PATENT DOCUMENTS 3,497,953 A * 3/1970 Weissman ............ A61C 8/0075
                                                  433/173
3,579,831 A   5/1971 Stevens
(Continued)

FOREIGN PATENT DOCUMENTS

AU  2014235703 A1 * 11/2015 ........... A61C 8/0012
KR  20020072632 A  *  9/2002 ........... A61C 8/0033
(Continued)

OTHER PUBLICATIONS

Neumeyer, S. Tooth implant, Machine translation (Year: 2006).*
(Continued)

*Primary Examiner* — Ralph A Lewis
*Assistant Examiner* — Mirayda A Aponte

(57) ABSTRACT

A dental implant having an anchoring system consisting of foldable fins actuated by an insertion screw; the dental implant is characterised by the following components: an implant body that includes an implant-abutment connection zone, an externally threaded zone, at least one pair of exit openings and an internally threaded zone; an anchoring having at least one pair of foldable fins and a top opening; an insertion screw having a head with an internal hexagonal socket, a stem and a screw thread; when the insertion screw is screwed into the top opening of the anchoring means, the insertion screw pushes the anchoring down into the implant body and causes the foldable fins to extend outwards through the exit openings.

8 Claims, 3 Drawing Sheets

(58) Field of Classification Search
CPC ..... A61C 8/0022; A61C 8/0028; A61C 8/005; A61C 8/0048; A61C 8/0069; A61C 8/0075
USPC ........................................ 433/174–176, 201.1
See application file for complete search history.

(56) References Cited

U.S. PATENT DOCUMENTS

| | | | | |
|---|---|---|---|---|
| 5,890,902 | A * | 4/1999 | Sapian | A61C 8/0048 433/177 |
| 6,447,295 | B1 * | 9/2002 | Kumar | A61C 8/0068 433/172 |
| 2003/0224328 | A1 * | 12/2003 | Sapian | A61C 8/0086 433/173 |
| 2004/0219488 | A1 * | 11/2004 | Choi | A61C 8/0025 433/165 |
| 2010/0304333 | A1 | 12/2010 | Ghavidel et al. | |
| 2017/0354485 | A1 * | 12/2017 | Chu | A61C 8/0022 |

FOREIGN PATENT DOCUMENTS

| | | | | |
|---|---|---|---|---|
| WO | WO-02062256 | A1 * | 8/2002 | ........... A61C 8/0033 |
| WO | WO-2007027794 | A1 * | 3/2007 | ........... A61C 8/0006 |
| WO | WO 2019/122473 | | 6/2019 | |

OTHER PUBLICATIONS

International Search Report and the Written Opinion dated May 20, 2019 From the International Searching Authority Re. Application No. PCT/ES2018/070801 and Its Translation of Search Report Into English. 9 Pages).

* cited by examiner

DENTAL IMPLANT WITH FOLDABLE FINS

RELATED APPLICATIONS

This application is a National Phase of PCT Patent Application No. PCT/ES2018/070801 having International filing date of Dec. 12, 2018, which claims the benefit of priority of Spanish Patent Application No. P201731459 filed on Dec. 22, 2017. The contents of the above applications are all incorporated by reference as if fully set forth herein in their entirety.

FIELD AND BACKGROUND OF THE INVENTION

The present invention relates to a dental implant having an anchoring system consisting of foldable fins actuated by an insertion screw. The present invention furthermore discloses the uses and advantages offered by this dental implant with respect to other products in the sector.

Dental implants are known today to be medical devices designed to replace the root of a tooth which is no longer present for any reason, and they have the function of keeping the artificial tooth in place. They are an undeniably safe and durable solution to the loss of one or several teeth. For this reason, innumerable types of dental implants and dental implant placement techniques have been developed, all of which seek to meet the medical needs that each patient may present.

Most the dental implants are made of titanium because of their contribution to the osseointegration process. Another important property is biocompatibility, their mechanical properties and high corrosion resistance.

Another feature that is widely accepted today is the surface roughness/porosity of an implant, which is considered a determining factor in the osseointegration process.

Another highly regarded requisite in dental implants is their primary stability, which is also essential for an optimal long-term osseointegration process. Once said stability has been achieved, the quality of that stability, how quickly it is achieved and how biomechanically strong it is are important, and these all depend in most cases on the presence of suitable anchoring systems.

Taking all this into account, the inventor of the present invention has developed a new dental implant having an anchoring system consisting of foldable fins actuated by an insertion screw. Said dental implant further has a trabecular-shaped porous structure, located particularly in the implant body.

SUMMARY OF THE INVENTION

The present invention consists of a dental implant with foldable fins characterised in that it comprises the following components:
  a) an implant body that comprises an implant-abutment connection zone, an externally threaded zone, at least one pair of exit openings and an internally threaded zone,
  b) an anchoring means comprising at least one pair of fins and a top opening,
  c) an insertion screw comprising a head with an internal hexagonal socket, a stem and a screw thread; when the insertion screw is screwed into the top opening of the anchoring means, it pushes the anchoring means down into of the implant body, which allows the foldable fins to extend outwards through the exit openings.

In a preferred embodiment of the present invention, the openings forming the pair of exit openings in the implant body are located facing one another, meaning in opposing positions, such that they correspond to the arrangement of the foldable fins of the anchoring means.

In the present invention, the implant body is characterised in that there is a trabecular-shaped porous structure in the externally threaded zone. In a more preferred embodiment, the porous structure is located in the spaces between the screw threads of the externally threaded zone.

It should be noted that the porous structure is highly osteoconductive, thereby allowing the rapid invasion by vascularised fibrous tissue, favouring the incorporation of surrounding bone 3 to 5 times more than on other rough surfaces. The action of the pores has a double effect. On one hand, it produces mechanical coupling with the bone, and on the other hand it has a biological effect where it exerts a direct and indirect influence on cells and their metabolism. Pre-osteoblasts show a type of "pore-philia" and their gene expression, gene differentiation and matrix deposition, which will be mineralised, depend on the signals received from the surface.

In an even more preferred embodiment of the present invention, the externally threaded zone is a double screw thread; this allows the distance between the screw thread pitch to be increased, less bone to be eliminated during insertion of the implant; the generated heat is also reduced and the insertion torque in low-density bones is increased.

In another preferred embodiment of the present invention, the externally threaded zone has a screw thread pitch of 0.5-2 mm, more preferably the screw thread pitch is 1 mm.

One aspect of the present invention that stands out is that the implant body has a self-tapping screw thread at its bottom end. This self-tapping screw thread has the capacity to change the orientation of the implant during the placement process, thereby allowing correct parallelism between implants to be achieved and their placement to be optimised.

In a particular embodiment of the present invention, the implant-abutment connection zone has an angle of 10°-20°, more preferably the angle is 16°. When 2 metal tapered parts are fitted together, each one of the parts having an angle of 8° or less, a wedge effect is produced due to the friction between the 2 walls, thereby achieving a mechanical closure.

One feature of the present invention that stands out is that the implant-abutment connection zone is fixed by a Morse taper connection, which allows the microgap between the implant/abutment connection to be decreased because the contact surface between them is increased, thereby minimising bacterial microfiltration, so bone tissue resorption decreases, with the soft tissues remaining stable with a better long-term aesthetic result. The Morse taper connection absorbs the vibration and pressure exerted on the abutment, preventing the prosthetic screw from coming loose.

As indicated above, the anchoring means comprises at least one pair of fins and a top opening. The fins slide through the inside of the implant body as the insertion screw exerts force on said anchoring means. In a preferred embodiment, the anchoring means is made of titanium because of its high mechanical strength, which enables its fins to be extended by the action of the insertion screw, as well as said fins to be drawn in if it were necessary to remove the implant.

In a preferred embodiment of the present invention, at least one pair of fins of the anchoring means will be anchored in the cortical wall of the mandible or maxilla, whichever is appropriate.

It should be pointed out in the present invention that both the turns forming the externally threaded zone of the implant and the foldable fins constitute primary stabilisation components, particularly in type (IV) bones with low density, having a thin cortical layer. For bone of this type, dental implants with reinforced fixing components, particularly in the mid-high zone of the implant and not at their bottom end particularly, are required. This is also why, in a preferred embodiment of the present invention, the trabecular-shaped porous structure, which facilitates greater cell proliferation and migration, is located in this zone, thereby allowing bone tissue to grow therein.

In relation to the top opening, this allows or enables the connection between the anchoring means and the insertion screw.

In relation to the insertion screw, as indicated above, it comprises a head with an internal hexagonal socket, a stem and a screw thread. In the case of the internal hexagonal socket, this facilitates the handling of the screw, both in its insertion and in the extraction of the dental implant, with the corresponding instruments. In the case of the stem, this is located inside the top opening of the anchoring means, whereas the screw thread allows the insertion screw to move up and down through the internally threaded zone of the implant body, driving the pin inside it outwards with respect to the implant.

It is very important to highlight that the configuration of the anchoring-insertion screw assembly allows the dental implant to be placed by screwing it and to be extracted or removed by unscrewing it, because in the screwing operation the head with an internal hexagonal socket of the insertion screw pushes the anchoring means into the implant, whereas, in the opposite operation, the screw thread of the screw pushes the anchoring means towards the top or outer part of the implant.

In regard to the process of manufacturing the dental implant object of the present invention, it will be done by additive manufacturing (the addition of material in layers) by a 3D printer. The concept of 3D printing has transformed additive manufacturing technology from a 3D CAD file. It is a good alternative when the geometry of the object to be manufactured is very complex and its size is relatively small, as in the case of the dental implant of interest.

BRIEF DESCRIPTION OF THE SEVERAL VIEWS OF THE DRAWINGS

For the purpose of complementing the description provided above and to facilitate better understanding of the features of the present invention, the figures described below are attached as an integral part of the description.

DESCRIPTION OF SPECIFIC EMBODIMENTS OF THE INVENTION

Figure 1:
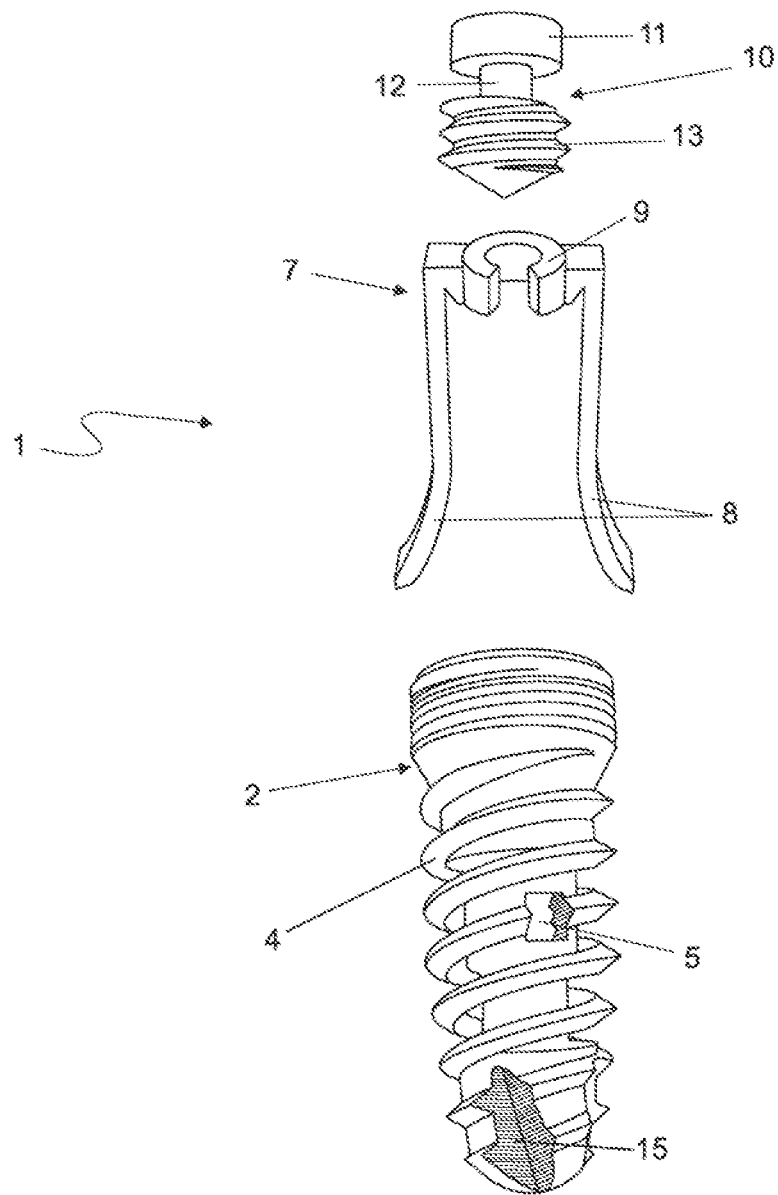
FIG. 1 depicts a schematic view of the different components forming the dental implant object of the present invention.

According to an embodiment of the present invention, FIGS. 1-4 show the dental implant (1) object of the present invention through the main components forming same. Namely, the dental implant (1) with foldable fins (8) is characterised in that it comprises the following components:
  a) an implant body (2) that comprises an implant-abutment connection zone (3), an externally threaded zone (4), at least one pair of exit openings (5) and an internally threaded zone (6),
  b) an anchoring means (7) comprising at least one pair of foldable fins (8) and a top opening (9),
  c) an insertion screw (10) comprising a head (11) with an internal hexagonal socket, a stem (12) and a screw thread (13),
  when the insertion screw (10) is screwed into the top opening (9) of the anchoring means (7), it pushes the anchoring means (7) down into the implant body (2) and causes the foldable fins (8) to extend outwards through the exit openings (5).

Figure 2:
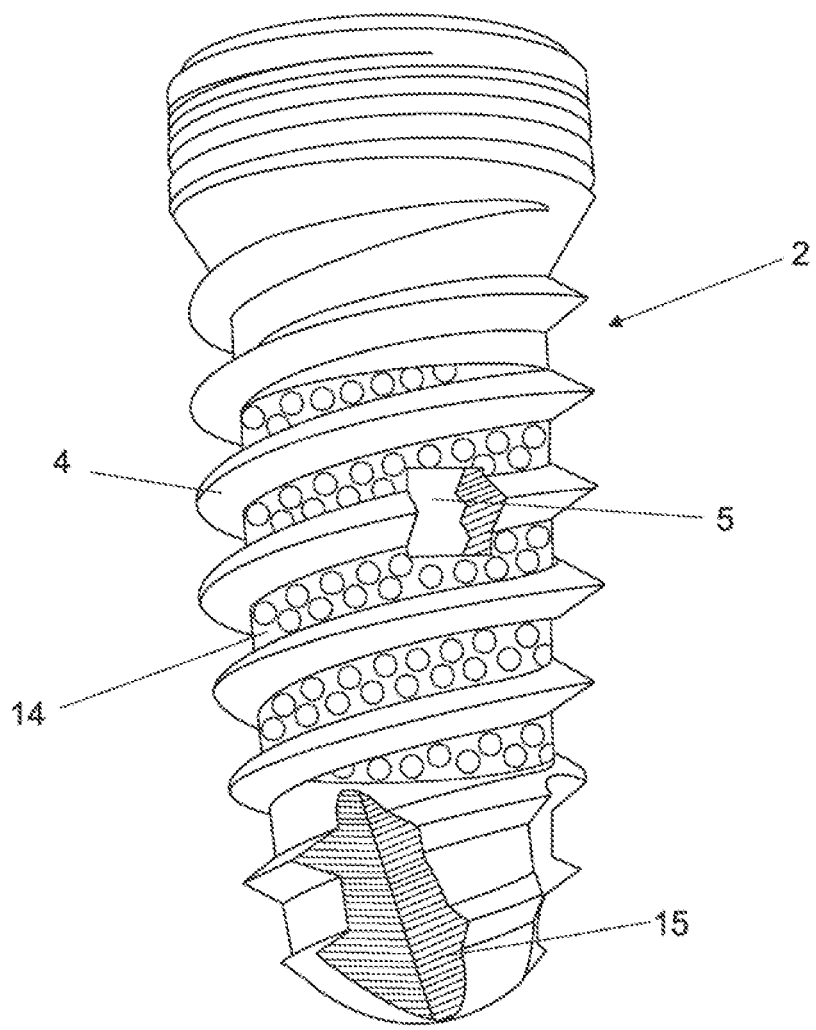
FIG. 2 depicts a schematic view of the dental implant object of the present invention having a trabecular porous structure in the spaces between the screw threads of the externally threaded zone.

As shown in FIG. 2, the dental implant (1) has a porous structure (14) in the mid-high zone of the implant. Namely, there is a trabecular-shaped porous structure (14) in the externally threaded zone (4). Specifically, said porous structure (14) is located in the spaces between the screw threads of the externally threaded zone (4). This porous structure (14) located in the mid-high zone of the implant facilitates the osseointegration process of said dental implant (1). Additionally, it can be seen that the implant body (2) has a self-tapping screw thread (15) at its bottom end.

Figure 3:
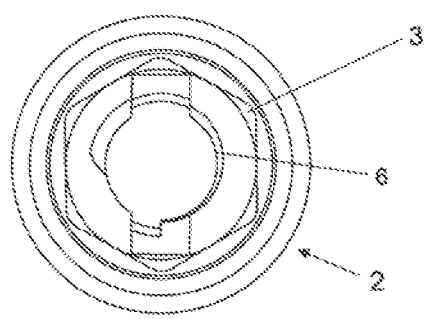
FIG. 3 depicts a top view of the implant body.

FIG. 3 depicts a top view of the implant body, in which the implant-abutment connection zone (3) and the internally threaded zone (6) can be seen.

Figure 4:
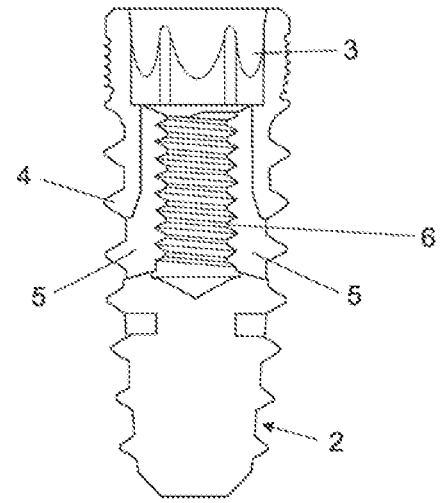
FIG. 4 depicts a schematic view corresponding to a cross-section of the implant body.

FIG. 4 depicts a schematic view corresponding to a cross-section of the body of the dental implant (1). A pair of exit openings (5), an externally threaded zone (4) and an internally threaded zone (6) can be seen in said figure. The externally threaded zone (4) is a double screw thread.

Figure 5A:
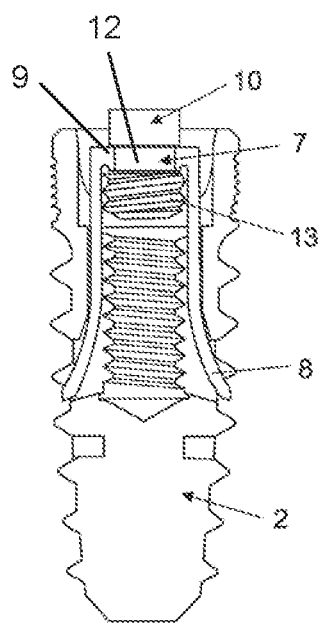
FIGS. 5A and 5B depict a schematic view of the dental implant with all the components that form same. A) Dental implant in the non-assembled position. B) Dental implant in the assembled position.

It can be seen in FIG. 5A how the insertion screw (10) is screwed into the top opening (9) of the anchoring means (7), before carrying out the assembly of the dental implant (1).

Figure 5B:
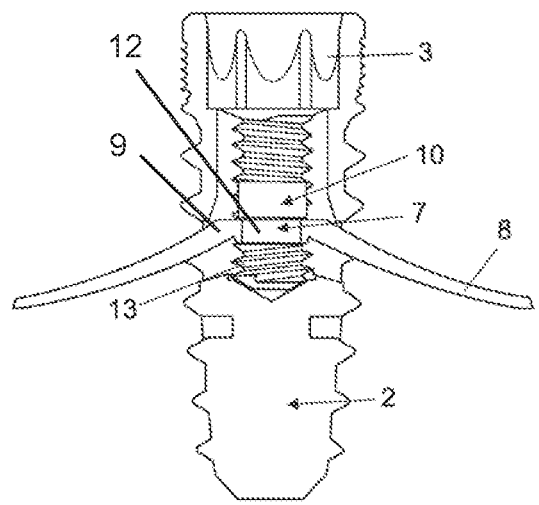

When the screwing operation is performed, the anchoring means (7) is forced down into the implant body (2) by the downward pushing action exerted by the insertion screw (10), so the foldable fins (8) exit through the exit openings (5) towards the cortical zone of the mandible or maxilla, where they will be anchored. The arrangement adopted by the different components of the dental implant (1) after said screwing operation is depicted in FIG. 5B.

What is claimed is:
1. A dental implant (1) with foldable fins (8), characterised in drat the dental implant (1) comprises the following components:
  a) an implant body (2) that comprises an implant-abutment connection zone (3), an externally threaded zone (4), at least one pair of exit openings (5) and an internally threaded zone (6),
  b) an anchoring (7) comprising at east one pair of foldable fins (8) and a top opening (9),
  c) an insertion screw (10) comprising a head (11) with an internal hexagonal socket, a stem (12) and a screw thread (13)
wherein the insertion screw (10) is enabled to be engaged into the top opening (9) of the anchoring (7), and the screw thread (13) of the insertion screw (10) is enabled to be screwed at the internally threaded zone (6) of the implant body (2), and when the screw thread (13) of the insertion screw (10) is screwed at the internally threaded zone (6 of the implant body (2), the insertion screw (10) pushes the anchoring (7) down into the implant body (2) and causes the foldable fins (8) to extend outwards through the exit openings (5) wherein the implant-abutment connection zone (3) is fixed by a Morse taper connection.

2. The dental implant (1) with foldable fins (8) according to claim 1, wherein there is a trabecular-shaped porous structure (1A) in the externally threaded zone (4).

3. The dental implant (1) with foldable fins (8) according to claim 1, wherein the porous structure (14) is located in the spaces between the screw threads of the externally threaded zone (4).

4. The dental implant (1) with foldable fins (8) according to claim 1, wherein the externally threaded zone (4) is a double screw thread.

5. The dental implant (1) with foldable fins (8) according to claim 1, wherein the externally threaded zone (4) has a screw thread pitch of 0.5-2 mm.

6. The dental implant (1) with foldable fins (8) according to claim 1, wherein the implant body (2) has a self-tapping screw thread (15) at its bottom end.

7. The dental implant (1) with foldable fins (8) according to claim 1, wherein the implant-abutment connection zone (3) has an angle of 10°-20° outwardly of a longitudinal axis of the implant body (2).

8. A dental implant (1) with foldable fins (8), characterised in that the dental implant (1) comprises the following components:
 a) an implant body (2) that comprises an implant-abutment connection zone (3), an externally threaded zone (4), at least one pair of exit openings (5) and an internally threaded zone (6),
 b) an anchoring (7) comprising at least one pair of foldable fins (8) and a top opening (9),
 c) an insertion screw (10) comprising a head (11) with an internal hexagonal socket a stem (12) and a screw thread (13),
wherein the insertion screw (10) is enabled to be engaged into the top opening (9) of the anchoring (7), and the screw thread (13) of the insertion screw (10) is enabled to be screwed at the internally threaded zone (6 of the implant body (2), and when the screw thread (13) of the insertion screw (10) is screwed at the internally threaded zone (6) of the implant body (2), the insertion screw (10) pushes the anchoring (7) down into the implant body (2) and causes the foldable fins (8) to extend outwards through the exit openings (5), wherein the insertion screw (10) and anchoring (7) being configured in size and shape to provide for engagement of the stem (12) of the insertion screw (10) at the top opening (9) of the anchoring (7).

\* \* \* \* \*